(12) United States Patent
Chiodo

(10) Patent No.: US 6,363,750 B1
(45) Date of Patent: Apr. 2, 2002

(54) AUTOMATIC PIPETTE PULLER AND FORGE

(76) Inventor: Chris D. Chiodo, 29277 Newport, Warren, MI (US) 48093

( * ) Notice: Subject to any disclaimer, the term of this patent is extended or adjusted under 35 U.S.C. 154(b) by 0 days.

(21) Appl. No.: 09/513,407

(22) Filed: Feb. 25, 2000

(51) Int. Cl.[7] .............................................. C03B 23/047
(52) U.S. Cl. ............................ 65/108; 65/112; 65/275; 65/276; 65/278; 65/280; 65/283; 65/292; 65/DIG. 9; 422/99; 422/104
(58) Field of Search ........................... 65/112, 275, 276, 65/278, 280, 283, 292, DIG. 9, 108; 422/99, 104

(56) References Cited

U.S. PATENT DOCUMENTS

| | | | | |
|---|---|---|---|---|
| 3,145,091 A | * | 8/1964 | Sonni et al. | |
| 4,111,677 A | * | 9/1978 | Andrews | 65/276 |
| 4,530,712 A | | 7/1985 | Kopf | 65/270 |
| 4,869,745 A | | 9/1989 | Flaming | 65/270 |
| 5,017,208 A | * | 5/1991 | Gregory et al. | 65/283 |
| 5,041,152 A | * | 8/1991 | Nishigaki et al. | 65/292 |
| 5,181,948 A | | 1/1993 | Belgum | 65/105 |
| 5,370,843 A | | 12/1994 | Chiodo | 422/99 |
| 6,079,230 A | * | 6/2000 | Kong | 65/276 |

* cited by examiner

Primary Examiner—Michael Colaianni

(57) ABSTRACT

A glass tube is positioned over a heater and stretched until drawn apart into two drawn portions. A controlled pulling force is applied to the tube by a powered driver such as a linear motor. After separation, one of the drawn glass portions is repositioned over the heater and reciprocated in a controlled fashion by the driver to refine the geometry of the fine tip formed on the resulting pipette.

13 Claims, 4 Drawing Sheets

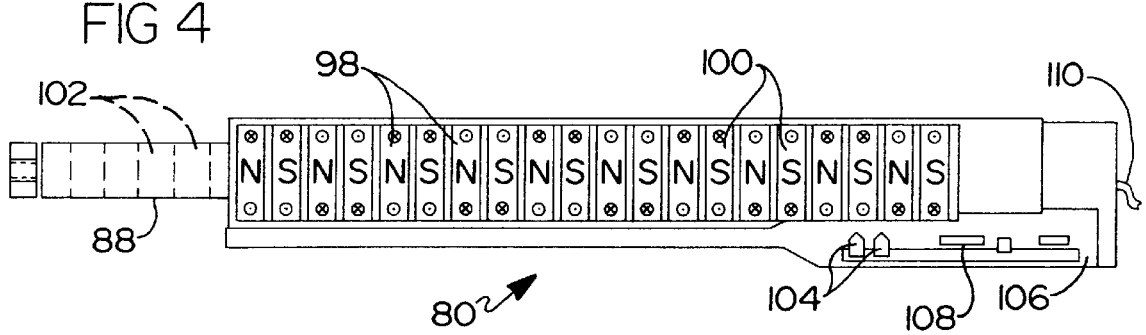
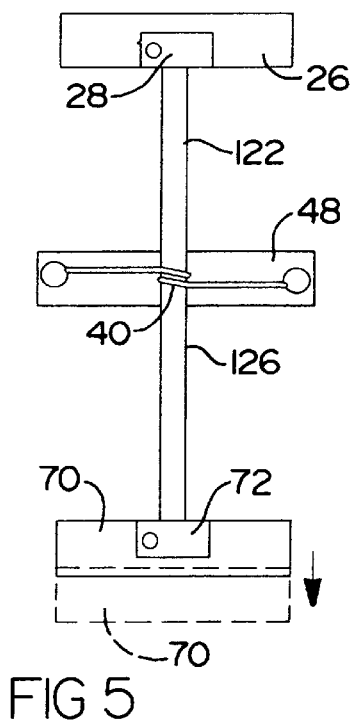
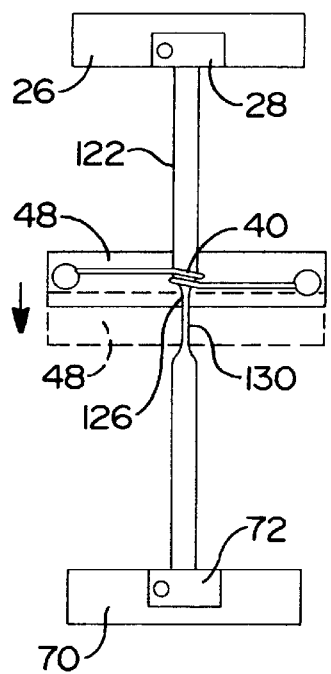

FIG 7
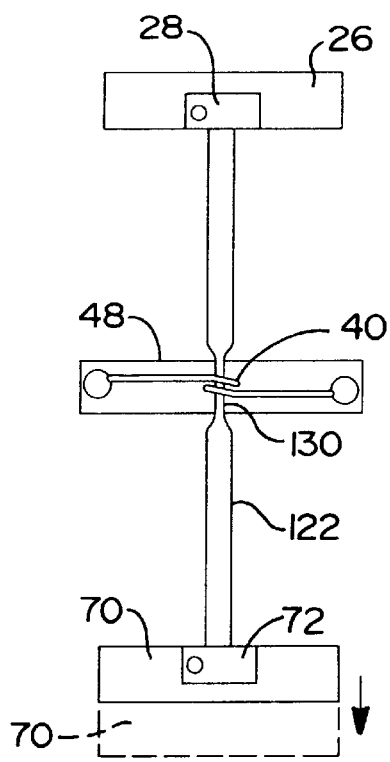
FIG 9
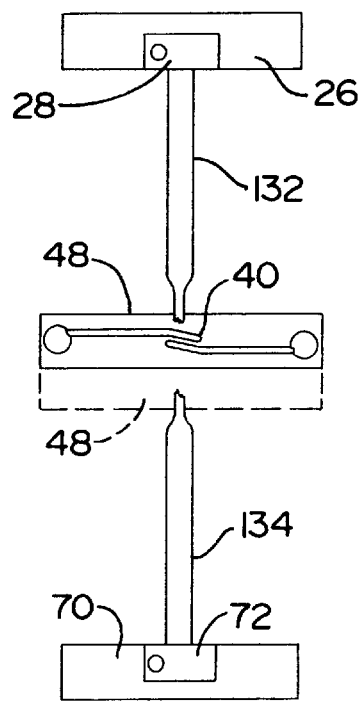
FIG 8
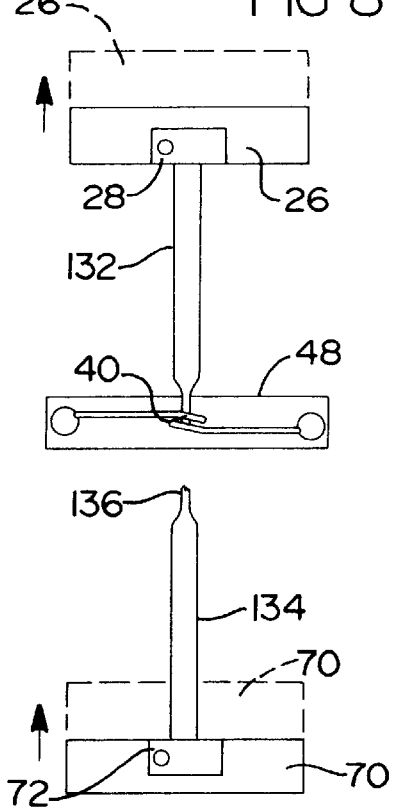
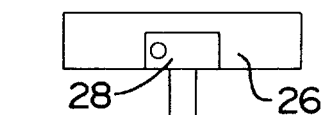
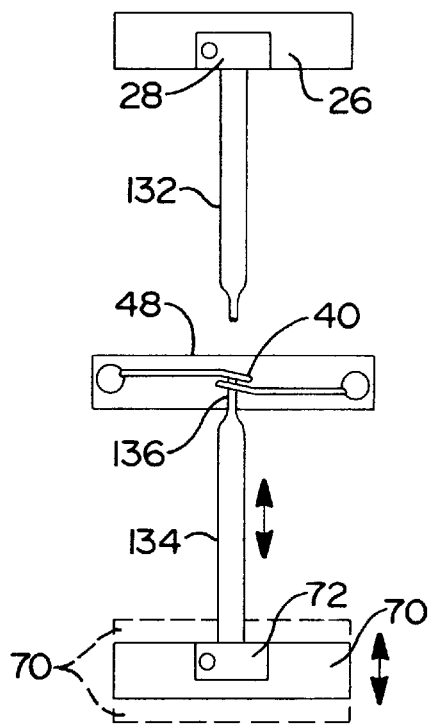
FIG 10

AUTOMATIC PIPETTE PULLER AND FORGE

BACKGROUND OF THE INVENTION

1. Field of the Invention

The present invention relates in general to the fabrication of glass pipettes and relates in particular to an apparatus which forms fine tipped glass pipettes during a pulling operation and which is adapted to modify the geometry of the pipette tips during a heat treating operation.

2. Description of Prior Developments

Equipment for producing pipettes has been available in numerous configurations for producing various types of fine tipped glass tubes such as injection pipettes and patch pipettes. Although such apparatus has generally functioned satisfactorily, most require significant knowledge and skill to operate properly so as to produce uniform results and consistent product quality.

That is, conventional pipette pulling apparatus typically apply a tensile load to a thin glass tube as the tube is heated to a point where the tensile strength of the glass decreases. The tube then stretches or elongates under the applied load as the heated and softened region necks down and breaks in two. At this point, the fine tipped section created at the break is typically removed from the pulling apparatus and further conditioned in a secondary heat treating operation.

More particularly, the fine tipped pipettes are placed in a secondary heating apparatus known as a "forge" where the fine tips of the tubes are heated under controlled conditions to modify the geometry of the glass tips. During these heating operations, generally referred to as "fire polishing", the tips of the pipettes are typically moved back and forth over a heating element or within an oven so as to modify the shape and size of the opening within and around the tip of the pipette.

It can be appreciated that the secondary forging or heating operation is not only time consuming, since it necessitates removal of the pipette from a pulling apparatus and placement in a forge, but is also expensive insofar as a separate forging apparatus must be purchased to carry out additional heating operations.

Another problem encountered with conventional pipette pulling apparatus is the relatively complex process involved in producing larger diameter patch pipettes. While small diameter injection pipettes, also known as intracellular pipettes, can be fabricated with a single pulling step, larger diameter patch pipettes typically require a two stage heating and pulling operation which is more labor intensive and subject to more process variables than a single stage pulling operation.

During a two stage pulling operation, a glass tube is initially heated at a first predetermined temperature while being subjected to a first predetermined tensile load. Once the tube elongates a predetermined amount, the tube elongation and the travel of that half of the pipette being pulled (typically by a dead weight) is limited by a preset travel stop.

At this point, the heating element, which was initially centered over the necked down region between the two halves of the heated tube, is deactivated and manually moved several millimeters to a second preset location which coincides with the new location of the center of the necked down region of the glass tube. The heater is then reactivated to a second preset temperature which is typically higher than that of the first heating step.

Once the heater is reactivated for a preset period of time, a second tensile load is applied and the travel stop is manually removed to allow the tube to stretch even further to the point where it breaks in two. The second tensile load can be applied as a simple dead weight which operates purely by gravity, or by a positively driven load produced by a solenoid. Again, once the tube is pulled apart, the tip of the pipette tube is typically removed from the pulling apparatus and heated in a separate heating apparatus, such as a forge, where a reciprocatory fire-polishing operation is effected. This entire operation requires considerable expertise, and is subject to numerous process variables leading to non-uniform pipette tip geometry.

Accordingly, a need exists for a method and apparatus for producing glass pipettes which reduces the level of operator skill required to consistently produce high quality pipettes having uniform dimensions and uniform functional characteristics.

A further need exists for such a method and apparatus which obviates the need for a separate heating apparatus or "forge" for carrying out secondary heating operations on a pipette, such as fire polishing operations.

Yet another need exists for such a method and apparatus which is highly automated so as to reduce the amount of labor and time required to produce high quality glass pipettes.

The aforementioned objects, features and advantages of the invention will in part, be pointed out with particularity, and will, in part, become obvious from the following more detailed description of the invention, taken in conjunction with the accompanying drawings, which formn an integral part thereof.

SUMMARY OF THE INVENTION

The present invention has been developed to fulfill the needs noted above and therefore has as an object the provision of a method and apparatus for producing fine tipped glass pipettes with relatively low skilled operators.

A further object of the invention is the provision of a method and apparatus for consistently producing high quality glass pipettes in a highly automated system which promotes uniform product features and product performance.

Still a further object of the invention is to provide a highly automated method and apparatus for producing high quality glass pipettes using a minimum amount of labor and time.

Yet a further object of the invention is to provide a method and apparatus which obviates the need for separate heating apparatus for carrying out secondary heating operations on a pipette tip, such as fire polishing operations.

Another object of the invention is the provision of a method and apparatus for producing both single stage and two stage pulled pipettes which are loaded and drawn with a highly controlled positive driver which is not limited to acceleration provided by gravity.

Yet another object of the invention is the provision of a method and apparatus for producing pipettes using a linear motor for generating highly controlled tensile loads on glass tubes as they are stretched into fine tipped pipettes.

These and other objects are met by the present invention which is directed to a method and apparatus for producing high quality glass pipettes having uniform dimensions and consistent product performance. Rather than applying a tensile load to a pipette tube with a dead weight during a pulling operation, the present invention uses a highly accurate and highly controllable linear motor to provide a carefully controlled tensile pulling load to such a glass tube as it is being heated and stretched.

Because a linear motor can apply a controlled variable stroke length and a controlled driving force in two opposing axial directions, a pipette can be reintroduced into the same heater as that used during pulling for subsequent heating as required, for example, to finely finish the geometry of the pipette tip. Moreover, because a linear motor can provide high acceleration to a pipette as it is being elongated, highly customized pipette tip configurations can be produced.

A particular advantage of a linear motor, as used in the present invention, is the ability to produce a carefully timed sequence of controlled movement, such as the reciprocatory movement often used during fire polishing. Such finely controlled variable length movements are not possible with conventional fixed stroke solenoid-actuated pipette pullers.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 4 is a view in central section of the linear motor of FIG. 2;

FIG. 5 is a schematic view of a glass tube clamped in the apparatus of FIGS. 1 and 2;

FIG. 6 is a view of FIG. 5 after the glass tube has been heated and stretched to a first length;

FIG. 7 is a view of FIG. 6 showing a second heating and stretching operation;

FIG. 8 is a view of FIG. 7 after the glass tube has been stretched apart and showing a first variation of the invention;

FIG. 9 is a view of FIG. 7 after the glass tube has been stretched apart and showing a second variation of the invention; and FIG. 10 is a view showing a further heating operation being performed on the pipette produced according to FIG. 8 or FIG. 9.

In the various views of the drawings, like reference characters designate like or similar parts.

DETAILED DESCRIPTION OF THE PREFERRED EMBODIMENTS

Figure 1:
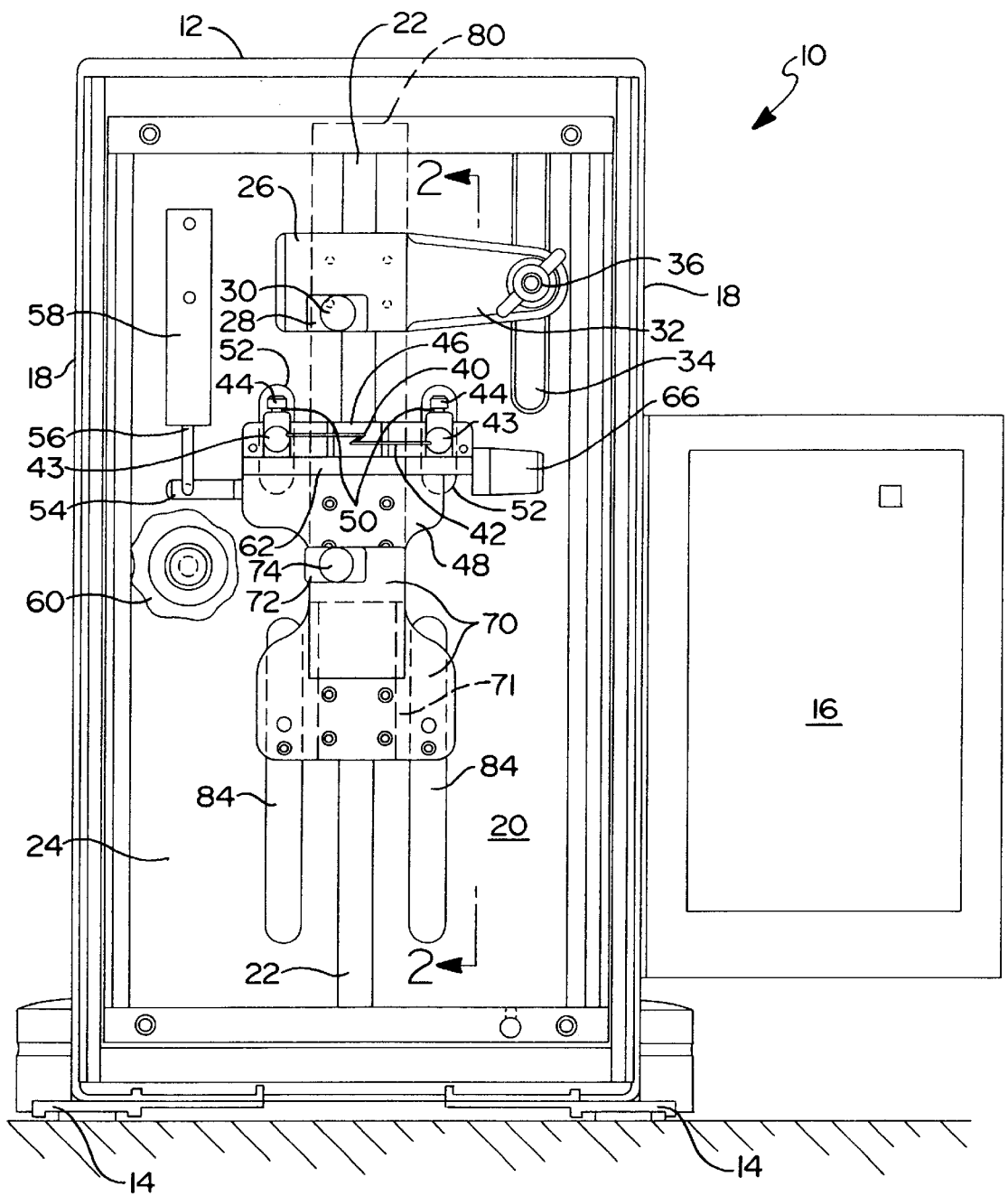
FIG. 1 is a front elevation view of a pipette pulling and heating apparatus constructed in accordance with the invention.

The present invention will now be described in conjunction with the drawings, beginning with FIG. 1 which shows a pipette pulling and heating apparatus 10 constructed in accordance with the invention. The apparatus 10 includes a rectangular box-shaped cabinet 12 which includes two or four leveling pads 14 located at the bottom corners of the cabinet. A control panel 16 is mounted to a sidewall 18 of cabinet 12.

A support such as a rigid metal planar support plate 20 formed of aluminum alloy or steel is rigidly fixed between the sidewalls 18, 18. A linear slideway rail 22 is mounted along the center of the top or outer surface 24 of plate 20 and extends along substantially the full length of plate 20. A first carriage 26 is mounted on the rail 22 with high accuracy linear bearings for free smooth sliding movement over the rail.

A clamp plate 28 is adjustably secured to carriage 26 with a threaded clamp screw 30. A recessed groove is formed in the upper surface of the carriage 26 and in the lower or underside surface of clamp plate 28 to define a generally cylindrical clamping pocket within which the end of a glass pipette tube may be securely clamped in a known fashion. Alternatively, radially adjustable collets can be used in place of the clamps.

Carriage 26 includes an extension arm 32 which extends transversely over a guide slot 34 formed through support plate 20. Slot 34 extends along plate 20 parallel to rail 22. An adjustable winged clamp screw 36 extends through the extension arm 32 and into slot 34. A clamp plate is located beneath slot 34 and is threaded to clamp screw 36 to allow the extension arm 32 and the carriage 26 to be linearly adjusted along rail 22 and clamped in place in a desired position along rail 22.

A heater for heating a glass tube is adjustably mounted on support plate 20. The heater can take the form of a coil 40 of resistance wire 42 through which a glass tube is mounted as discussed below. Alternatively, a flat resistance heating ribbon can be used in place of coil 40. The heater wire 42 is connected by clamps 43 to a pair of electrodes 44 which are mounted on an electrical insulator block 46 which extends transversely over rail 22. Coil 40 is centered over rail 22.

The insulator block 46 is mounted to a second carriage 48 which is mounted for sliding movement on rail 22 with a linear bearing in a known fashion. Electrical power wires 50 extend through plate 20 from within cabinet 12 via a pair of clearance slots 52 which extend parallel to and symmetrically about rail 22. Wires 50 are attached to electrodes 44 to power the heater, i.e. coil 40.

A driver arm 54 is connected at one end to the second carriage 48 and at its other end to an actuator 56 of a powered driver 58. Driver 58 can take the form of an electrically powered solenoid or a fluid driven cylinder such as an air cylinder or motor which operates on external pressurized shop or laboratory air.

Actuator 56 has a preset throw or travel, such as for example, 3 millimeters. This throw can be adjusted with an adjustable stop such as the indexed rotary cam wheel 60 which engages the driver arm 54 and stops the travel of the second carriage 48. When the actuator 56 is powered, it drives the second carriage 48 away from the first carriage 26 and holds the second carriage in a fixed position as set by cam wheel 60. When the actuator 56 is depowered, a return spring or other return force applicator returns the second carriage 48 to its original predetermined home position.

A conventional known lateral adjustment may be provided on the second carriage 48 for adjusting the sideward or transverse position of the coil 40 on the insulator block 46. A threaded rotary lead screw 62 journaled to the insulator block engages fixed teeth on the second carriage 48. The electrodes 44 are mounted and fixed on the insulator block 46. Turning knob 66 back and forth causes the insulator block 48 and the electrodes 44 to slide back and forth across the carriage 48 so as to accurately position circular coil 40 coaxially around a glass tube as described below.

A third carriage 70 is mounted in a known fashion to the slideway rail 22 with linear bearings 71 for free accurate sliding movement along the rail. Each carriage 26, 48 and 70 may have the same type of mounting to rail 22. A clamp plate 72 is adjustably secured to the third carriage 70 with a threaded clamp screw 74 which is threaded through the clamp plate and into the carriage body.

Figure 2:
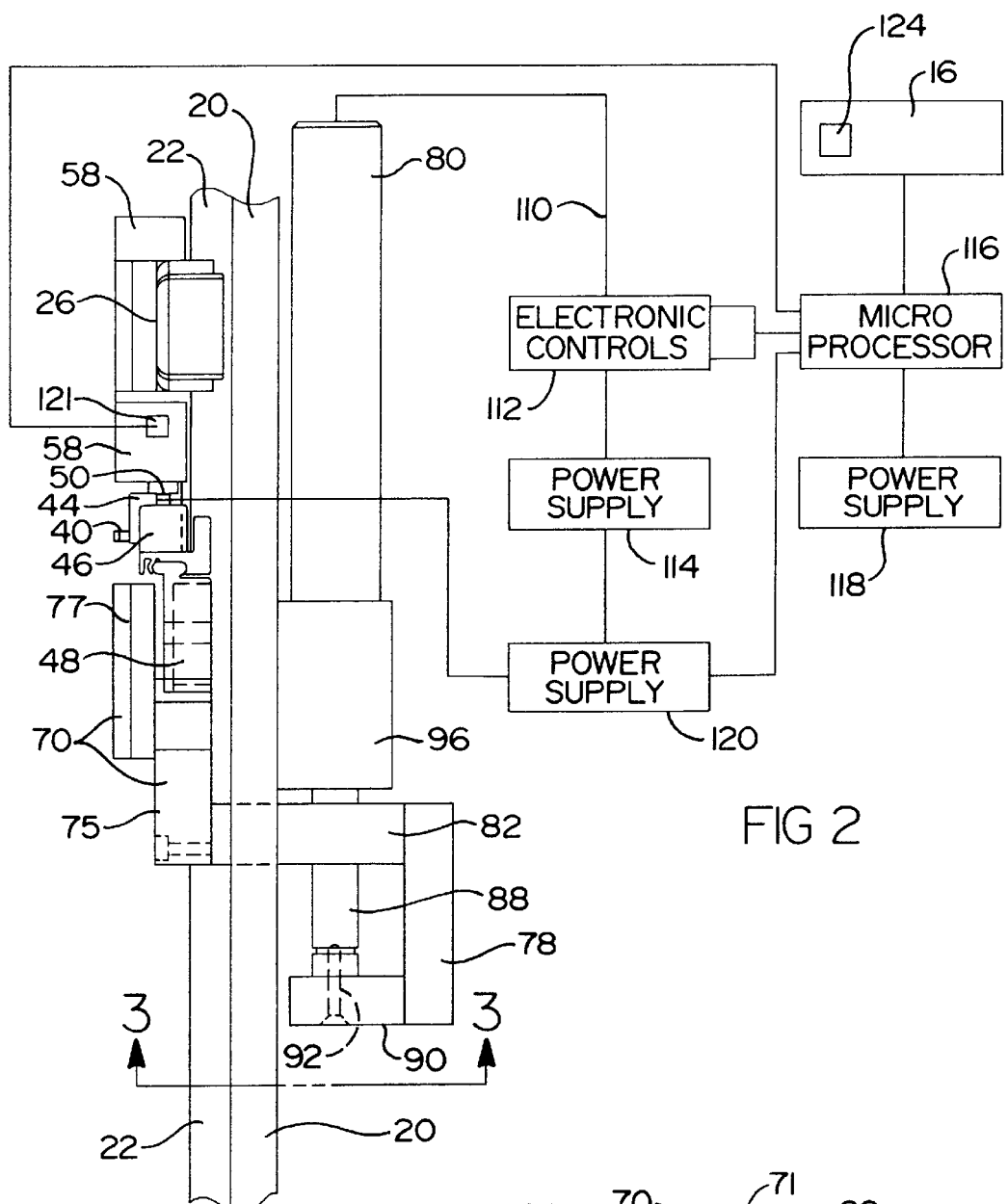
FIG. 2 is a schematic side view, partially in section along section line 2—2 of the apparatus of FIG. 1 showing in block diagram the major components of a control system.

A cylindrical clamping pocket is formed between the clamp plate 72 and carriage 70 as discussed above with respect to the other clamp plate 28. As seen in FIG. 2, carriage 70 has a lower or base portion 75 slidably attached to rail 22 and an upper cantilevered portion 77 fixed to the base 75 and spaced above plate 20 so as to be slidable over the top surface of a portion of carriage 48.

Figure 3:
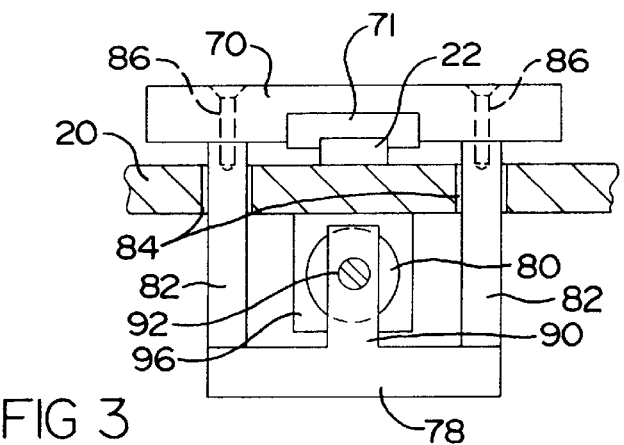
FIG. 3 is a partial view in section taken along section line 3—3 of FIG. 2.

As seen in FIGS. 2 and 3, the third carriage 70 is connected by a yoke 78 to a powered driver 80 located within cabinet 12. Yoke 78 has a pair of arms 82 which respectively extend through a pair of parallel slots 84 formed through the support plate 20. Slots 84 are aligned parallel to rail 22 to allow the arms 82 to move the third carriage 70 smoothly along rail 22. Arms 82 may be connected to the underside of carriage 70 with screws 86.

As further seen in FIGS. 2 and 3, the yoke 78 is connected to the sliding actuator rod 88 of the driver 80 by a flange 90. A threaded fastener 92 passes through flange 90 and into the end of the rod 88 to form a secure interconnection therebetween. A mounting bracket 96 securely mounts the driver 80 to the underside or rear surface of plate 20.

Although any controllable powered reciprocating driver can be used for driver 80, it has been found preferable to use a linear motor of the type commercially available under the brand LinMot P linear motors. As seen in FIG. 4, such a linear motor includes a series of alternating north (N) 98 and south (S) 100 stator windings encircling a sliding actuator rod 88. Actuator rod 88 is formed as a hollow chromium steel tube which houses a series of axially spaced neodymium magnets 102. Position sensors 104 are mounted in a housing 106 for providing a position feedback signal to microelectronics 108 also held within housing 106.

Plain bearings are housed in the stator windings 98, 100 for guiding rod 88. There is no electrical connection between the sliding rod 88 and the stator formed by windings 98, 100. Referring again to FIGS. 2 and 4, a control and power cable 110 supplies power and control signals to the linear motor driver 80. Control signals supplied by a commercially available microprocessor-controlled electronic controller 112 causes the power from a commercially available power supply 114 to positively drive the actuator rod 88 back and forth according to a preselected pattern of movement. The movement of rod 88 directly translates into movement of the third carriage 70.

Virtually any pattern or sequence of controlled powered movement can be imparted to actuator rod 88 and the third carriage 70 by appropriate programming of a standard off-the-shelf microprocessor 116 which is powered by a standard power supply 118. Microprocessor 116 can also control another power supply 120 for selectively supplying power to the electrodes 44 of the heater coil 40.

The driver 58 which drives the heater coil 40 and insulator block 46 back and forth along rail 22 is also controlled by the microprocessor 116 via a conventional electrically-actuated valve assembly 121. The controller 112, power supply 114, microprocessor 116, power supply 118, and power supply 120 are all mounted within cabinet 12 and operated by switches on the control panel 16 (FIG. 1).

The operation of the apparatus 10 is schematically shown in FIGS. 5 through 10. Beginning with FIG. 5, a glass tube 122 is clamped at one end to the upper or first carriage 26 with clamp plate 28 and at its other end to the lower or third carriage 70 with clamp plate 72 after being inserted through heater coil 40 on the center or second carriage 48. Once the glass tube 122 is clamped in place, a start button 124 on control panel 16 is pushed or actuated to begin a preprogrammed pipette pulling and heating process in accordance with the invention.

Upon such actuation of the pulling process, the heating coil 40 is powered by power supply 120 to reach a first predetermined temperature and the linear motor driver 80 is powered by power supply 114 and controlled by controller 112 to apply an axial pulling force on the third carriage 70 via rod 88 and yoke 78. This pulling force is applied to glass tube 122 via clamp plate 72. As the heating coil 40 heats the glass tube 122 and causes it to weaken, the third carriage 70, as shown in dashed lines in FIG. 5, moves axially downwardly and independently away from the first carriage 26 as the heated portion 126 of the glass tube 122 begins to stretch and form a necked down region 130, as seen in FIG. 6.

Once the third carriage 70 moves a predetermined distance, such as six millimeters, the linear motor driver 80 is programmed to stop and the heater coil 40 can be, and preferably is, deactivated. At this point, the microprocessor 116 energizes driver 58 causing actuator 56 to reposition the second carriage 48 and heater coil 40 over the center of the necked down region 130. The movement of the second carriage 48 represented in dashed lines in FIG. 6 is limited and preset by the engagement of driver arm 54 with cam wheel 60. A typical movement of about 3 millimeters will reposition coil 40 over the center of the necked down region 130 as shown in FIG. 7.

At this point, the heater coil 40 is reactivated to a second predetermined temperature and the driver 80 is repowered to again apply an axial pulling force on the glass tube 122. As the glass tube stretches further, the third carriage 70 independently moves further down along rail 22, as shown in dashed lines in FIG. 7. Eventually, the glass tube 122 breaks into two pieces or halves 132, 134 as shown in FIG. 8.

At a predetermined length of travel on rail 22, the travel of the third carriage is stopped by deactivating driver 80 according to the program set by the microprocessor. At this point the upper half 132 of the glass tube 122 is removed from coil 40 by one of several possible steps. As shown in FIG. 8, the first or upper carriage 26 can be manually retracted upwardly away from the second carriage 48 by manually loosening clamp screw 36 and the underlying clamp plate and manually sliding carriage 26 upwardly along rail 22. It is also possible to provide another driver similar to driver 58 for automatically moving the first carriage 26 in the same fashion that driver 58 moves the second carriage.

Another step for removing the upper half 132 of the glass tube 122 is to allow driver 58 to drive the second carriage 48 further downwardly toward the third carriage 70 as represented by the dashed lines in FIG. 9. If this option is used, the cam wheel 60 is moved or removed to allow for the additional travel stroke of actuator 56.

Whether the upper half 132 of the glass tube 122 is removed from the heater coil by the step of FIG. 8 or FIG. 9, the resulting relative position of the upper carriage 26 and upper half 132 of the glass tube is shown in FIG. 10. Once the upper half of the glass tube is removed from the coil 40, the driver 80 drives the third carriage 70 upwardly toward the second carriage a preset distance so that the tip 136 of the lower half 134 of the glass tube is repositioned within the heater coil 40.

At this point, the driver 80 is programmed to effect a back and forth reciprocatory movement to the third carriage 70, thereby causing the tip 136 of the lower half 134 of the glass tube 122 to pass in and out of the coil 40 with coil 40 being energized at a third predetermined temperature. This heating of tip 136 effects a desirable shaping of the end of tip 136 as well as the opening formed within the tip. This last heating of tip 136 is conventionally carried out in a separate heater called a forge. Because a linear motor is used to drive the pipette back over the heater after completion of the pulling operation, no forge is required.

The process described above is a two step pulling process typically used for producing patch type pipettes. However, the apparatus 10 can be easily programmed to effect a single pulling process for producing intracellular pipettes. In this case, the pulling step of FIG. 6 is extended until the glass tube 122 is broken in half as shown in FIG. 8 and the second pulling step of FIG. 7 can be eliminated. Final heating of tip 136 can then be carried out as described above in connection with FIG. 10.

There has been disclosed heretofore the best embodiment of the invention presently contemplated. However, it is to be understood that the various changes and modifications may be made thereto without departing from the spirit of the invention. For example instead of employing clamps such as clamp plates to hold the glass tube on the apparatus 10, any type of holder such as a chuck or collet could be used.

What is claimed is:

1. An apparatus for producing a pipette, comprising:
   a support;
   a first clamp supported by said support;
   a second clamp supported by said support;
   a heater disposed between said first and second clamps; and
   an electrically powered driver coupled to and driving said second clamp toward and away from said heater and driving said second clamp independently of said first clamp.

2. The apparatus of claim 1, wherein said powered driver comprises a linear motor.

3. The apparatus of claim 1, wherein said support comprises a linear slideway.

4. The apparatus of claim 1, wherein said first clamp comprises a movable clamp movable towards and away from said heater.

5. The apparatus of claim 1, wherein said heater comprises a movable heater movable towards and away from said second clamp.

6. The apparatus of claim 5, further comprising a powered heater driver connected to said heater.

7. The apparatus of claim 6, wherein said heater driver comprises a solenoid.

8. The apparatus of claim 6, wherein said heater driver comprises a fluid cylinder.

9. An apparatus for producing a pipette, comprising:
   first and second clamps adapted to clamp a glass tube on said apparatus;
   a heater disposed on said apparatus for heating said glass tube; and
   a linear motor connected to said second clamp for driving said second clamp back and forth adjacent said heater and driving said second clamp independently of said first clamp.

10. The apparatus of claim 9 wherein said first clamp is movable towards and away from said heater.

11. The apparatus of claim 9, further comprising a powered heater driver connected to said heater for driving said heater between said first and second clamps.

12. The apparatus of claim 11, further comprising a stop provided on said apparatus limiting movement of said heater.

13. The apparatus of claim 9, further comprising a linear slide, and wherein said first and second clamps are slidably mounted on said linear slide.

* * * * *